(No Model.)
N. BARRY, Jr.
TRAP FOR WASTE PIPES.
No. 265,372. Patented Oct. 3, 1882.
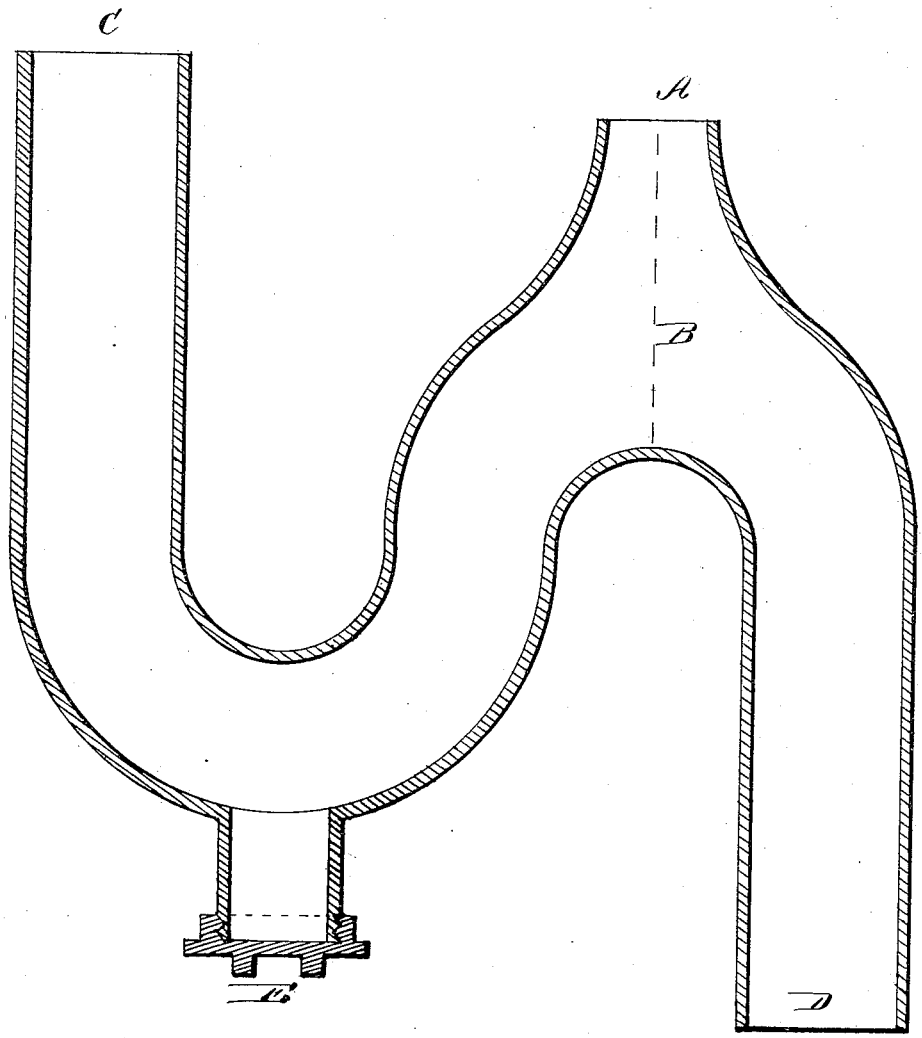

United States Patent Office.

NICHOLAS BARRY, JR., OF MUSCATINE, IOWA.

TRAP FOR WASTE-PIPES.

SPECIFICATION forming part of Letters Patent No. 265,372, dated October 3, 1882.

Application filed March 27, 1882. (No model.)

*To all whom it may concern:*

Be it known that I, NICHOLAS BARRY, Jr., of the city of Muscatine, in the county of Muscatine and State of Iowa, have invented certain new and useful Improvements in Traps for Waste-Pipes; and I do hereby declare that the following is a full, clear, and exact description thereof, reference being had to the accompanying drawing, and to the letters of reference marked thereon, which form part of this specification.

The drawing represents a vertical section of an S-trap with my invention applied.

This invention relates to an improvement on traps for waste-pipes; and the nature of my invention consists in a trap of S shape, which is constructed with a downwardly-flaring vent arranged directly over the inverted curve and adapted to have attached to it a vent-pipe for carrying off the foul gases, as will be hereinafter explained.

The following description of my invention, when taken in connection with the annexed drawing, will enable others skilled in the art to understand it.

Traps for waste-pipes having the well-known S form have been provided with vent-pipes by cutting a hole through the highest part of the inverted curve and inserting a pipe, which pipe was secured in place by a lead joint which had to be "wiped." This plan was not only expensive, but a roughness was necessarily left on the inside of the trap at the very point where there should not be the least obstruction to the flow of water and substances through the trap.

I cast or form the improved S-shaped trap with a short vent, A, and arrange this vent as nearly over the "water-seal" as practicable—that is to say, the vent is located at the highest point of the inverted curve. The vent is made to flare downwardly, so that the diameter of the trap at the point indicated by the vertical dotted line B is greater that at any other point of the trap. I therefore effectually prevent the lodgment of filth and other substances at said point.

It will be seen that the vent A is of sufficient length to prevent any obstruction being formed by the joint where the waste-pipe is attached to it.

C designates the inlet of the trap, D the outlet, and E the well-known trap screw or plug.

This invention is applicable to traps known as " S," " one-half S," "three-quarter S," &c., and not only acts as a vent, but prevents siphonage, thus always preserving the water-seal in its proper place.

Having described my invention, I claim—

The new article of manufacture consisting of the trap for waste-pipes, formed entire, and having a deep vertical chamber at B, a downwardly-flaring vent, A, an inflow-passage, C, an outflow-passage, D, and a screw-tapped collar, all constructed substantially in the manner and for the purposes described.

In testimony that I claim the foregoing as my own I affix my signature in presence of two witnesses.

NICHOLAS BARRY, JR.

Witnesses:
D. M. LAMBERT,
GEO. W. SMALLEY.